United States Patent [19]
Konik

[11] Patent Number: 5,768,455
[45] Date of Patent: Jun. 16, 1998

[54] FIBER OPTIC CONNECTOR

[75] Inventor: Walter Stan Konik, Lilburn, Ga.

[73] Assignee: Lucent Technologies Inc., Murray Hill, N.J.

[21] Appl. No.: 751,469

[22] Filed: Nov. 19, 1996

[51] Int. Cl.⁶ .................................................. G02B 6/36
[52] U.S. Cl. ........................... 385/86; 385/80; 385/84
[58] Field of Search ............................ 385/86, 80, 84, 385/60, 66, 68, 72, 76, 78

[56] References Cited

U.S. PATENT DOCUMENTS

| | | | |
|---|---|---|---|
| 4,634,214 | 1/1987 | Cannon, Jr. et al. | 350/96.2 |
| 5,018,316 | 5/1991 | Mulholland et al. | 51/216 R |
| 5,136,672 | 8/1992 | Mulholland et al. | 385/53 |
| 5,181,267 | 1/1993 | Gerace et al. | 385/86 |
| 5,212,752 | 5/1993 | Stephenson et al. | 385/78 |
| 5,363,459 | 11/1994 | Hultermans | 385/60 |
| 5,394,497 | 2/1995 | Erdman et al. | 385/78 |
| 5,465,313 | 11/1995 | Belenkiy et al. | 385/80 |

*Primary Examiner*—Phan T. H. Palmer

[57] ABSTRACT

A fiber optic connector includes a ferrule assembly in which the ferrule is mounted in a barrel member having a first bore therein for containing a buffered fiber and a second, larger bore for containing any excess epoxy introduced during connectoriziation. The first and second bores are connected by a tapered section. A cable retaining member has a first, cup-shaped end which surrounds the barrel member, a first bore and a second smaller bore which has a diameter greater than the diameter of the buffered fiber to permit the buffered fiber to bend. The end of the retention member remote from the cup-shaped end has a tapered opening leading into the second bore.

12 Claims, 3 Drawing Sheets

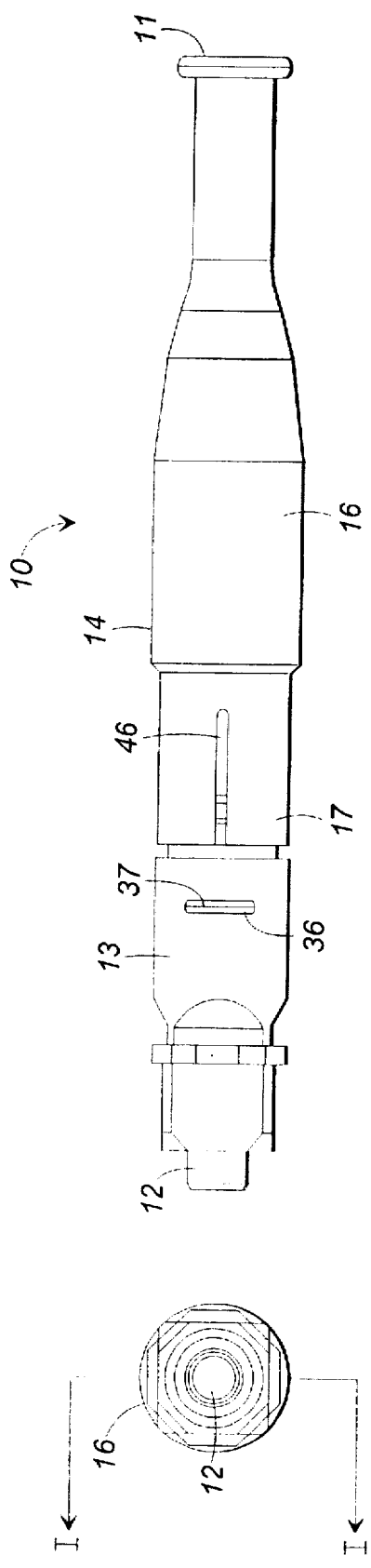
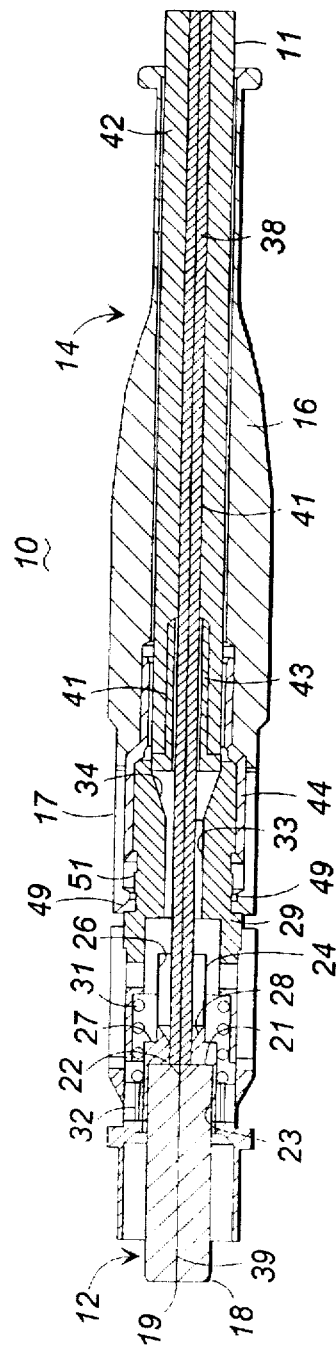

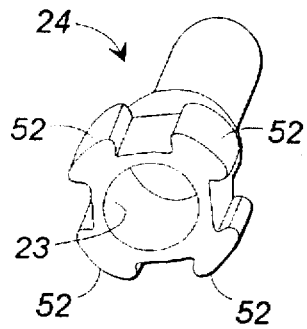
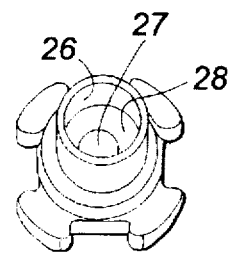
FIG. 3A  FIG. 3B
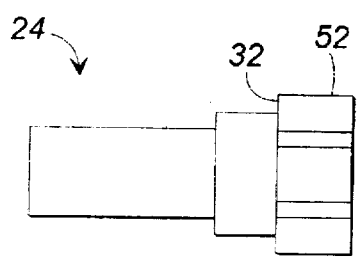
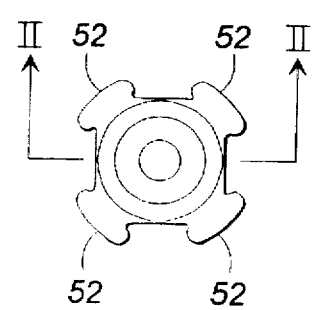
FIG. 4A  FIG. 4B
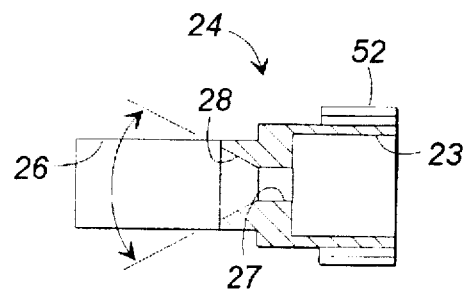
FIG. 4C

FIBER OPTIC CONNECTOR

FIELD OF THE INVENTION

This invention relates to a connections for an optical fiber connector and, more particularly, to a ferrule connector of the SC type.

BACKGROUND OF THE INVENTION

Optical fiber connectors are essential components of optical fiber communications systems. They may be used to join lengths of optical fiber cables to produce longer lengths, thus functioning somewhat as splices, or they may be used to connect optical fibers to active devices such as radiation sources, detectors, or, for example, repeaters or other active apparatus as well as passive devices such as alternators or switches.

An optical fiber connector must be capable of joining optical fibers with a minimum of insertion loss, and must provide mechanical stability and protection to the junction between the optical fibers in the working environment. The achievement of low insertion loss in coupling two fibers together is a function of the alignment of the optical fiber ends, the width of the gap between the ends, and the optical surface condition of the fiber ends. Stability and protection, especially at the junction, is generally a function of the connector design. Another consideration is that the connector be of a design that assures relative ease of installation in the field. It is highly desirable that a connector be capable of being installed within a relatively short period of time without the necessity of special skills or dexterity on the part of the installer.

A typical optical fiber cable comprises a central buffered optical fiber surrounded by a flexible jacket of, for example, a solid polymeric material, the jacket having an outer diameter many times greater than the fiber diameter. Such a cable generally includes a load bearing portion for resisting tensile forces in the form of elongated strength members extending longitudinally and located between the buffered fiber and the jacket. Typically these strength members comprise elongated polymeric fibers having high tensile strength, such as KEVLAR®, a product of E. L. DuPont de Numours & Company. There have been numerous proposals for connectors which can be attached to such a cable and which meet or satisfy the criteria for connectors discussed in the foregoing. One such connector that has met with a great deal of commercial acceptance is the SC type connector, an example of which is shown in U.S. Pat. No. 5,212,752 of Stephenson, et al.

The SC connector includes a ferrule assembly which includes a barrel having a collar at one end and an optical fiber terminating ferrule projecting from the barrel. The ferrule assembly is disposed in a plug frame such that an end portion of the ferrule projects from one end of the plug frame and a strength member retention portion is disposed over the barrel projecting from the other end. The plug frame is configured so that it is polarized with respect to a grip into which the plug frame snap locks. One grip is inserted into one end of a coupler housing and another grip is inserted into the other end of the coupler housing to cause the ends of the ferrules to become disposed in optical connection with each other. The alignment ferrules receive, retain and align an optical fiber within the plug body, which fits within the coupler housing. It is generally, and preferably, the practice to connect the optical fiber within the ferrule by means of a suitable epoxy cement. The coupler, and, more particularly, the fiber, are resistant to tensile forces that occur in the field, for example, and the fiber so cemented moves with the ferrule, which, in the SC coupler, is spring loaded. Usually, the epoxy is introduced into the coupler by means of a syringe which, in the usual SC coupler, is a difficult operation inasmuch as the opening into which the syringe is introduced is quite small, and it is difficult to monitor the amount of epoxy that is introduced. In addition, when the syringe is withdrawn, it often happens that a portion of the epoxy remains on or follows the tip of the syringe, thereby removing it from the area where it is most desired, and introducing it into areas where it is not wanted. When the fiber is subsequently inserted, a portion of the epoxy is displaced and the displaced portion tends to wick toward the entrance end. This has the effect of causing some epoxy to escape into the interior of the coupler, which can cause improper or faulty operation thereof, such as preventing the spring-loaded portion of the connector, which includes the ferrule, from moving.

There have been numerous arrangements in the prior art for preventing the leakage or wicking of the epoxy cement. Thus in U.S. Pat. No. 5,394,497 of Erdman et al, there is shown a fiber optic connector which does not require the use of epoxy cement, nor does the arrangement shown in U.S. Pat. No. 5,088,804 of Grinderslev. These arrangements, however, deviate from the SC standard connector to a degree, whereas it would be preferable to have a connector that conforms closely to the established standard SC connector.

In U.S. Pat. No. 5,181,267 of Gerace et al, there is shown an optical fiber connector which is of the moving ferrule type, as is the SC connector, and which uses a sheath, such as plastic tubing, which fits over the end of a metallic body which, in turn fits over the end of the ferrule. Epoxy is introduced into the metallic body by means of a syringe inserted through the plastic tubing, and the tubing is made long enough to contain any epoxy that is wicked toward the open end. Thus the epoxy is contained and prevented from leaking into the interior of the connector. The plastic tube not only performs the function of containing the epoxy, it also is useful for guiding the syringe, and the fiber, into the frame. Thus the plastic tube achieves the desired end of containing the epoxy, however, it obscures access to the ferrule frame, represents an additional component part of the connector, which means additional parts inventory, and adds an incremental increase in the time necessary to assemble and attach the connector, inasmuch as it can be difficult inserting the needle into the tubing, which has a quite small interior diameter.

SUMMARY OF THE INVENTION

The present invention is a modified SC type coupler which does not require a separate tubular member for containing the epoxy and which is easily assembled from the component parts, albeit modified, of a standard SC connector. The invention is directed to enabling the injection of the epoxy into the desired location in the ferrule assembly by means of guide means formed within the parts of the SC connector for guiding the injecting syringe into place. The invention also includes a modified SC component for preventing escape of the liquid epoxy into the connector interior. Thus, the normal and conventional method of attaching a connector to a cable and to the optical fiber is unchanged, there being no additional steps such as attaching tubes or the like.

In a preferred embodiment of the invention, a connector of the SC type comprises a ferrule assembly including a ferrule portion having a central longitudinally extending bore for receiving an optical fiber. The proximal end of the ferrule has a tapered opening for guiding the optical fiber into the bore, and the ferrule end is mounted in a ferrule frame or barrel, preferably by a press fit therein. The barrel has a first bore therein for receiving a buffered fiber such that the end of the buffering material preferably butts against the proximal end of the ferrule. The barrel also has a second bore, which is of greater diameter than the buffer, axially aligned with the first bore and separated therefrom by a tapered portion or bore. When the buffered fiber is inserted into the larger bore through the open end of the barrel, the tapered portion functions to guide the buffered fiber into the smaller bore, and the taper in the proximal end of the ferrule guides the fiber into the central bore of the ferrule. At the end of the barrel adjacent the ferrule is an external flange which may be segmented for locating and orienting the barrel properly within a plug frame, which surrounds the ferrule assembly and butts against a shoulder in the plug frame. A cable retention member has one end thereof inserted within the plug frame and has a first interior bore which surrounds the barrel. The cable retention member has an internal shoulder formed therein by a second, smaller bore, and a coil spring which surrounds the barrel is located between the flange on the barrel and the shoulder within the cable retention member. Thus, the barrel and ferrule assembly is movable with respect to the plug frame and the cable retention member which is secured to the plug frame. The spring functions to force the flange on the barrel into contact with the shoulder in the plug frame. However, axial pressure on the distal end of the ferrule causes the ferrule to move rearwardly against the spring, thus allowing proper positioning of the ferrule when a butt connection is made to another connectorized fiber. In accordance with one aspect of the invention, the second smaller diameter bore in the cable retention member is considerably greater than the diameter of the buffering material, and has a tapered lead-in portion at the end remote from the end of the cable retention member which surrounds the barrel. Thus, the tapers in the cable retention member, the barrel, and the proximal end of the ferrule, each being successively smaller in diameter, function first to guide the epoxy injecting needle to the proper site and, after the needle is withdrawn, to guide the buffered fiber and the bare fiber into the assembly. The assembly process is thus both simplified and accelerated, representing a material saving in time and labor. In addition, the length of the barrel and the interior diameter thereof are such that when the inserted buffered fiber displaces some of the epoxy, the quantity of epoxy thus displaced does not escape from the barrel.

The remainder of the connector is substantially the same as a standard SC connector and comprises a sheath tube for insertion into the end of the fiber cable and which has a flange against which the cable jacket butts. Cable strength members are separated from the buffered fiber and surround the sheath tube while the buffered fiber passes through the tube into the cable retention member. A crimp sleeve surrounds a portion of the cable retention member and the end of the jacketed cable containing the sheath tube. When the cable, buffered fiber, and bare fiber are all properly in place, the crimp sleeve is crimped to joint the connector to the cable, and a boot is slipped over the crimp sleeve and a portion of the cable retention member. In actual use, the boot may be put in place prior to crimping.

In operation, when pressure is exerted on the distal end of the ferrule, as when making a connection, for example, the ferrule and the fiber contained therein move against the spring, compressing it slightly. This results in the buffer being compressed, since the remote end thereof is fixed relative to the connector. The smaller bore of the cable retention member is sufficiently greater in diameter than the buffer to allow it to bow somewhat under compression, thereby relieving the compression stress.

The various features and advantages of the present invention will be more readily apparent from the following detailed description, read in conjunction with the accompanying drawings.

DESCRIPTION OF THE DRAWINGS

FIG. 1A is a side elevation view of the connector embodying the principles of the invention;

FIG. 1B is an end view of the connector of FIG. 1A;

FIG. 2 is a cross-sectional view of the connector of FIGS. 1A and 1B taken along the line I—I of FIG. 1B;

FIG. 3A is a perspective view of the barrel of the connector viewed from the ferrule receiving end;

FIG. 3B is a perspective view of the barrel of the connector viewed from the buffered fiber receiving end;

FIG. 4A is a side elevation view of the barrel of the FIGS. 3A and 3B;

FIG. 4B is an end view of the barrel of FIG. 4A;

FIG. 4C is a cross-sectional view of the barrel of FIG. 4A taken along the line II—II of FIG. 4A;

DETAILED DESCRIPTION

Figure 5A:
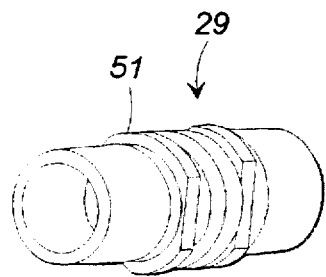
FIG. 5A is a perspective view of the cable retention member of the connector, reviewed from the buffered fiber receiving end.

FIGS. 1A and 1B depict an SC connector 10, which, although it embodies the features and principles of the present invention, is in all respects identical in exterior configuration as a standard SC connector. Connector 10 is adapted as terminate an optical fiber cable 11 and comprises a ferrule assembly 12, which will be discussed in greater detail hereinafter, a plug frame 13, which may be made of suitable plastic material such as a polycarbonate, and a cable strain relief portion or boot 14. The strain relief boot has a portion 16 which is flexible, preferably made of rubber or polyvinyl, and a rigid portion 17 which, as will be apparent hereinafter, surrounds the crimping section of the connector.

The assembled connector 10 is shown in greater detail in FIG. 2 where it can be seen that the ferrule assembly 12 comprises a ferrule member 18 having a central bore 19 therein for receiving an optical fiber. Bore 19 has, at the proximal end 21 of the ferrule, a tapered portion 22 which facilitates guiding the fiber into bore 19. The ferrule 18 is preferably made of a ceramic material and its proximal end 21 is seated in a receiving bore 23 in the barrel 24. Barrel 24 has an enlarged interior diameter chamber or bore 26 through which the buffered portion of the fiber passes, and a smaller bore 27 for receiving the buffered fiber. A tapered portion 28 leads from bore 26 to bore 27 for guiding the buffered fiber into the smaller bore 27.

A cable retention member 29 surrounds the barrel 24, having a bore whose interior walls are spaced from the barrel to provide a housing for a coiled spring 31, which bears against a flange 32 on the end of the barrel 24 and against an interior shoulder within member 29. Extending through at least a portion of the cable retention member 29 is a bore 33 of a diameter greater than the diameter of the buffered fiber. The fiber entrance end of member 29 has a tapered portion 34 which guides the buffered fiber into bore 33. Cable retention member 29 is held in place against the ferrule assembly 12 by means of plug frame 13 which has slots 36 therein which snap onto projections 37 on member 29, as will be explained more fully hereinafter. As thus far described, and with the connector 10 partially assembled from components 18, 24, 29, 31, and 13, the epoxy for gluing the fiber in place may be injected by a syringe which extends through member 29 and 24 to deposit the epoxy at the opening 22 in ferrule 18 and within the bore 27 in barrel 24. The tapered portions 28 and 34 serve as guides for the syringe needle, thereby eliminating the necessity of threading the needle through a tube, a tedious process which is common to prior art connectors.

The remainder of the connector 10 is the same as a standard SC connector. The cable 11 comprises a buffered fiber 38 having a length of bare fiber 39 extending from the end thereof. The buffered fiber 38 is surrounded by, most commonly, stranded strength members 41, such as Kevlar®, and the buffered fiber and strength members are encased in a jacket 42 of suitable flexible material. Near the end of the cable 11 to be connectorized, the jacket 42 is cut away and a flanged mandrel or tube 43 is inserted into the cable end, as shown, until the end of the jacket 42 butts against the flange on mandrel 43. The strength members pass over and surround the tube portion of mandrel 43 and also over and around the end of the cable retention member 29, as shown. A crimp member 44 surrounds both the end of cable retention member 29 and the end portion of cable jacket 42 which when crimped, holds the cable in place relative to the member 29. The crimp member 44 is held within boot 14, the rigid portion 17 of which is split, as at 46 to impart flexibility thereto. Each of the split portions 47 and 48 has a hook 49 on the end thereof which snaps over a projecting ridge 51 on the exterior of cable retention member 29 to hold the boot 14 in place.

FIG. 3A depicts the barrel 24 as viewed from the front, or ferrule end of the connector and shows the flange 32 as segmented into a plurality of segments 52. Segmenting of the flange is shown in U.S. Pat. No. 5,212,752 of Stephenson, et al. The ferrule receiving bore 23 is also shown. Barrel 24, which is also refereed to in the art as a ferrule frame, is preferably made of a metallic material such as, for example, stainless steel, but may also be made of plastic material. FIG. 3B depicts barrel 24 as viewed from the rear or buffered fiber receiving end, and shown the large diameter bore 26 and tapered portion 28, as well as the small diameter bore 27. FIGS. 4A, 4B, and 4C show the barrel 24 in greater detail. As best seen in FIG. 4C, barrel 24 comprises a first section having a ferrule receiving bore 23 into which the ferrule is press-fitted in accordance with present practice, and a second section having an upper bore 26 through which the buffered cable is passed. Bores 23 and 26 are connected by a third bore 27 adapted to contain the end of the buffered fiber buffering material. The fiber entrance end of bore 27 has a tapered section 28 for facilitating insertion of the buffered fiber into the bore 27, and also, prior to insertion of the fiber, for guiding the epoxy depositing needle to the desired location. Bore 26, which is considerably greater in diameter than the diameter of the buffered fiber, defines an empty volume for holding any epoxy displaced by the insertion of the buffered fiber. As an example, the diameter of the buffered fiber is approximately 0.034 inches, and the diameter of the bore 26 is approximately 0.062 inches, with a length of approximately 0.140 inches. The diameter of the bore 27 is approximately 0.039 inches and its length, including a sixty degree (60°) tapered portion 28, is approximately 0.07 inches. When the epoxy is in place, substantially filling bore 27 and the tapered portion 22 of ferrule 18, insertion of the buffered fiber will cause some of the epoxy to wick back into bore 26, but the length of bore 26 is such that the empty volume defined by bore 26 is sufficient to contain any excess epoxy. In other words, the empty volume defined by bore 26 with the buffered fiber in place is greater than the volume of the epoxy that is injected into the ferrule assembly. It has been found in practice that a ratio of bore 26 diameter to the diameter of the buffered fiber of approximately 1.7 to 2.0 for a length of bore 26 of approximately 0.120 to 0.150 inches affords more than adequate volume for containing excess epoxy. It has also been found that an approximately sixty degree (60°) taper 28 is adequate for guiding both the epoxy depositing needle and the buffered fiber.

Figure 5B:
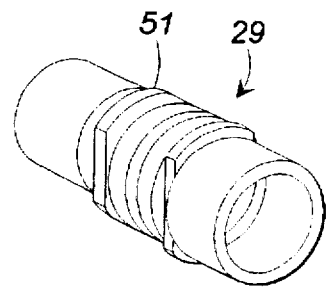
FIG. 5B is a perspective view of the cable retention member of the connector, viewed from the barrel receiving end.
Figure 6A:
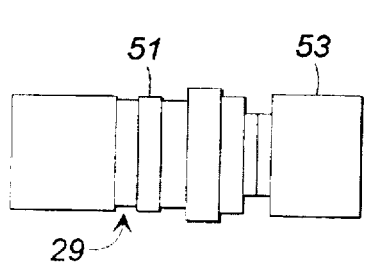
FIG. 6A is a side elevation view of the cable retention member.
Figure 6B:
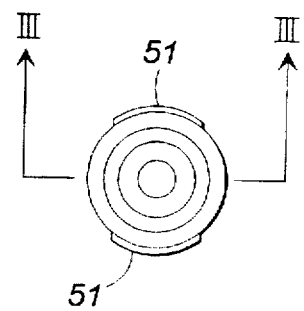
FIG. 6B is an end view of the cable retention member.
Figure 6C:
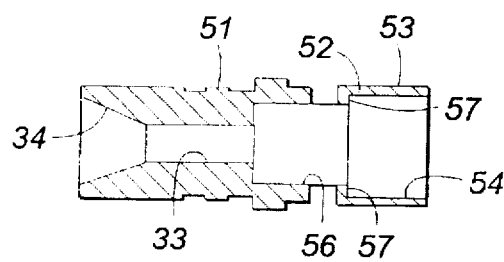
FIG. 6C is a cross-sectional view of the cable retention member taken along the line III—III of FIG. 6B.

FIGS. 5A and 5B are perspective views of the cable retention member 29 which is similar to a standard SC coupler retention member in its outer configuration. Shown are ribs 51 which are engaged by the hooks 49 on the ends of the segments of member 17, as discussed hereinbefore. FIGS. 6A and 6B are an elevation view and an end view, respectively, of cable retention member 29, and FIG. 6C is a cross-sectional view of member 29 taken along the line III—III of FIG. 6B. As shown in FIG. 6C, member 29 comprises a first, cup-shaped portion 53 having a bore 54 therein sufficient to surround barrel 24 and coil spring 31, as seen in FIG. 2. Member 29 has a second, smaller bore 56 sufficient to suspend barrel 24 and forming a spring seating shoulder 57 with bore 54. A third bore 33 joins bore 56 and is adapted to contain the buffered fiber which passes therethrough to barrel 24. A tapered portion 34 provides access to bore 33 and functions to guide both the epoxy deposing needle and the buffered fiber. Bore 33 has an inside diameter of approximately 0.062 inches and the buffered fiber has a diameter of approximately 0.034 inches, thus when the connector is assembled and is inserted into a connector adapter or other apparatus sufficient to cause movement of ferrule 18, the compressive force on the buffered fiber will cause it to bend. The enlarged diameter of bore 33 affords room for binding of the fiber, and it has been found that a ratio of bore diameter to fiber diameter of approximately two (2) is sufficient to allow bending within bore 33 adequate to accommodate any movement of ferrule 18. Portion 34 has, in practice, approximately a forty degree (40°) taper, which, as pointed out hereinbefore, is sufficient to guide the epoxy depositing needle and the buffered fiber when they are, in turn, inserted into the partially assembled connector.

The connector of the invention in the embodiment shown, makes possible the easy insertion of a syringe needle for depositing epoxy and the easy insertion of the buffered fiber to be connected. Extra parts, such as epoxy wicking tubes and the like, are not required, and an installer in the field, is connectorizing a buffered fiber, has his task made easier by not requiring careful threading of needles or fibers inasmuch as the components of the connector of the invention insure accurate placement and location of the needle or the fiber without undo effort on the installer's part.

It is to be understood that the various features of the present invention might be incorporated into other types of connectors besides the SC type, and that other modifications or adaptations might occur to workers in the art. All such variations and modifications are intended to be include herein as being within the scope of the present invention as set forth. Further, in the claims hereinafter, the corresponding structures, materials, acts, and equivalents of all means or step-plus-function elements are intended to include any structure, material, or acts for performing the functions in combination with other elements as specifically claimed.

We claim:

1. An optical fiber connector comprising:

a ferrule assembly including a ferrule and a barrel, said ferrule being mounted in said barrel at one end thereof and having a tapered opening at an opposing end for receiving an optical fiber therein;

said barrel comprising a member having a first bore for receiving said ferrule, a second, smaller bore for receiving a buffered fiber, and a third bore larger than said second bore and connected thereto by a tapered passageway; and a cable retention member having a cup-shaped opening at a first end surrounding said barrel and forming a space therewith for a spring member, a first bore smaller than said cup-shaped opening and forming therewith a shoulder seat for the spring, and a second bore smaller in diameter than said first bore for containing a buffered fiber, and a tapered portion at the end of said cable retention member remote from said cup-shaped end, said tapered portion leading into said second bore;

wherein the tapers in said tapered portion of said cable retention member, said tapered passageway and said tapered opening in said ferrule are successively smaller in diameter and are oriented to taper towards said ferrule for facilitating the injection of cementing material and to guide said optical fiber into said ferrule assembly.

2. An optical fiber connector as claimed in claim 1 wherein said second bore in said cable retention member is greater in diameter than the diameter of a buffered fiber.

3. An optical fiber connector as claimed in claim 2 wherein the diameter of said second bore is approximately twice the diameter of a buffered fiber.

4. An optical fiber connector as claimed in claim 3 wherein the diameter of said second bore is approximately 0.062 inches.

5. An optical fiber connector as claimed in claim 1 wherein said third bore of said barrel defines an empty volume when a buffered fiber is contained therein that exceeds the volume of epoxy injected into the ferrule assembly.

6. An optical fiber connector as claimed in claim 5 wherein the ratio of the diameter of said third bore to the diameter of a buffered fiber is in the range of 1.7 to 2.0.

7. An optical fiber connector as claimed in claim 1 wherein the angle of taper of said tapered passageway is sixty degrees (60°).

8. An optical fiber connector as claimed in claim 1 wherein said tapered portion of said cable retention member is tapered at an angle of approximately forty degrees (40°).

9. An optical fiber connector for connecting to a buffered optical fiber comprising:

a ferrule having a longitudinally extending bore therein for receiving an optical fiber, said ferrule having a proximal end and a distal end;

means in said proximal end of said ferrule for guiding said fiber into said bore in said ferrule;

a flanged barrel member having an opening therein at one end for receiving the proximal end of said ferrule;

means in said barrel member defining an empty volume having a capacity sufficient to hold any excess cement material;

further means in said barrel member for guiding a buffered fiber axially to said ferrule;

a cable retention member having first and second ends, said first end having a cup shaped portion adapted to surround said barrel member and means forming a shoulder therein;

spring means adapted to bear against the flange portion of said barrel member and said shoulder in said cable retention member for permitting movement between said barrel member and said cable retention member;

a bore extending through said cable retention member for containing a buffered fiber extending through said cable retention member; and means in said cable retention member for axially guiding a buffered fiber into said bore in said cable retention member;

wherein said guiding means in said cable retention member, said barrel member and said proximal end of said ferrule cooperate to facilitate the injection of cementing material into said connector for securing said fiber to said barrel member and said ferrule.

10. An optical fiber connector as claimed in claim 9 wherein said bore in said cable retention member has a diameter approximately twice the diameter of a buffered fiber.

11. An optical fiber connector as claimed in claim 9 wherein said means in said barrel member for guiding a buffered fiber comprises a tapered portion extending at least partially from said means defining an empty volume to said opening for receiving said ferrule.

12. An optical fiber connector as claimed in claim 9 wherein said means in said cable retention member for axially guiding a buffered fiber comprises a tapered bore extending from the second end of said cable retention member to said bore therein.

* * * * *